(12) United States Patent
Roth et al.

(10) Patent No.: US 6,385,562 B1
(45) Date of Patent: *May 7, 2002

(54) METHOD AND APPARATUS FOR MONITORING A PLANT WITH SEVERAL FUNCTIONAL UNITS

(75) Inventors: Stefan Roth, Eisenbrechtshofen (DE); Wolfgang Schwarzinger, Vienna (AT)

(73) Assignees: Kuka Roboter GmbH, Augsburg (DE); igm Robotersysteme AG, Wiener Neudorf (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,914

(22) Filed: Apr. 28, 1998

(30) Foreign Application Priority Data

May 1, 1997 (DE) .......................................... 197 18 284

(51) Int. Cl.[7] ............................................... G06F 11/00
(52) U.S. Cl. ............................................ 702/188; 714/1
(58) Field of Search ........................ 200/17 R; 700/1, 700/2, 174, 469, 470, 3, 4; 192/116.5, 129, 130; 191/8; 361/1, 80, 170, 186–7; 901/49; 74/2, 469; 340/500, 825.06; 377/1, 2, 3; 116/67 R; 194/239, 304; 187/390; 714/798, 707, 1, 718, 746, 48; 395/909, 917, 908, 904, 907, 906, 916, 912, 915; 702/180

(56) References Cited

U.S. PATENT DOCUMENTS

| | | | | |
|---|---|---|---|---|
| 4,596,982 A | * | 6/1986 | Bahr et al. ............. | 340/825.05 |
| 4,918,690 A | * | 4/1990 | Markkula, Jr. et al. ....... | 370/94 |
| 5,063,527 A | * | 11/1991 | Price et al. ................. | 364/550 |

FOREIGN PATENT DOCUMENTS

| | | | |
|---|---|---|---|
| DE | 3706325 | 9/1988 | |
| DE | 4041062 | 7/1992 | |
| DE | 4223435 | 6/1994 | |
| DE | 19620065 | 11/1997 | |
| DE | 19718284 | 2/1998 | |
| EP | 0400624 | 12/1990 | .......... G05B/19/403 |
| WO | 9516943 | 6/1995 | .......... G05B/19/042 |
| WO | 9517706 | 6/1995 | ........... G05B/15/02 |

* cited by examiner

Primary Examiner—Marc S. Hoff
Assistant Examiner—Edward Raymond
(74) Attorney, Agent, or Firm—Antonelli, Terry, Stout & Kraus, LLP

(57) ABSTRACT

For increasing the safety monitoring of a plant with several functional units, such as a production plant, the invention provides a method and apparatus, in which each functional unit is individually monitored or checked by its own redundant two-channel safety device. The safety devices constantly inform one another of their monitoring state. In the case of a malfunction of at least one functional unit or safety device, at least one safety-relevant actuator is operated. For achieving this objective, an apparatus is constructed with each functional unit being associated with a safety device and the safety devices are interconnected so that, in the case of a malfunction of at least one functional unit or safety device, at least one safety-relevant actuator is operated.

29 Claims, 2 Drawing Sheets

| Operator protection | opened | | closed | |
|---|---|---|---|---|
| consent | no | yes | no | yes |
| Test (yes) | off | on | off | on |
| Automatic (yes) | off | off | on | on |

Fig. 3

METHOD AND APPARATUS FOR MONITORING A PLANT WITH SEVERAL FUNCTIONAL UNITS

BACKGROUND OF THE INVENTION

1. Field of the Invention

The invention relates to a method and an apparatus for monitoring a plant having several functional units, such as a production plant.

2. Description of the Prior Art

Hitherto in the case of control devices parallel emergency shut-off wiring systems have been used, which are implemented in relay technology. Problems have arisen in connection with the safety with programming hand-operated equipment (operating units), whose flexible connecting cables are exposed to many actions, so that it is not possible to reliably exclude short-circuiting between emergency shut-off lines. The necessary two-channel or duct nature also makes the cable stiff, thick and heavy. Parallel-wired safety circuits are designed in an application-specific manner and offer no flexibility. Functional changes are only possible through reconstruction. Emergency-off loops and operator protection loops are admittedly extendable, but do not offer the possibility of a diagnosis, if a signal generator is opened in the safety circuit of a machine control. In addition, it is difficult to monitor and maintain such safety devices and the large number of participating contacts of the safety logic has a negative influence on operating safety and reliability.

Therefore the problem solved by the invention is to provide a method and an apparatus, by means of which in a simple, easily monitored manner it is possible to bring about an increase in safety in a complex plant, of the type described hereinbefore.

SUMMARY OF THE INVENTION

In a plant, such as a production plant, on which the invention is based, it can be a question of one or more associated machines, such as e.g. robots. A machine or robot comprises several different functional units, such as the power module of a control unit and an operating unit. In such a plant, several such machines can cooperate and be interlinked with the functional units. In addition, peripherals can be present, such as rails, on which are moved the machines, such as robots, or a portal, which moves the machines or robots along a "workpiece" to be machined, such as a ship.

According to the invention the problem of the prior art is solved by a method of the aforementioned type, wherein each functional unit is individually checked or monitored by its own redundant, two-channel safety devices, the safety devices continuously inform one another about their inspection state and in the case of a malfunction of at least one functional unit or safety device, a safety-relevant actuator is operated. In a device according to the invention with each functional unit is in each case associated its own redundant, two-channel safety device and the safety devices are so interconnected that in the case of a malfunction of at least one functional unit or safety device, they operate at least one safety-relevant actuator.

The invention provides a distributed safety logic, in which each safety device has all the necessary safety functions, which permits a high quality diagnosis. The safety devices are connected or communicate with one another, so that they can monitor one another and a safety device is able to detect the failure of another such device and can therefore emit a safety-relevant signal for operating an actuator.

According to a first, preferred embodiment, the safety devices have a controller core and an interface wiring. As a result the safety devices can be constructed in a very simple and easily monitorable manner.

According to a preferred development, the safety devices serially communicate or are interconnected with one another. As a result of the serial connection, parallel wiring is rendered superfluous. Necessary cable cross-sections can be reduced, which is in particular very advantageous for portable equipment, such as operating or programming hand-operated equipment.

According to another preferred embodiment, the safety devices communicate with one another by means of a ring protocol or the safety devices are interconnected in a ring. Thus, the complete safety mechanism can be randomly extended in a simple manner. If e.g. the plant receives further functional units, the associated safety devices can be readily, easily integrated. This ensures a simple, easily monitorable adaptability to different plants. Addressing can take place physically by placing in the bus. A reliable reaction is immediately attainable on extending the ring protocol.

It is possible for each safety device to have at least one microprocessor. According to a preferred further development, each safety device has at least two microprocessors. According to other preferred developments, each safety device has diagnostic inputs and in particular the diagnostic inputs are synchronized with test switching cycles of the safety-relevant inputs or the safety devices continuously perform a diagnosis of the functional units associated with them and consequently the plant. This makes it possible to localize signal generators, which have emitted a safety-relevant signal. It is also possible to carry out a permanent monitoring and diagnosis of the complete plant.

According to another preferred development, microprocessors contained in the safety devices cyclically check their processor image and the result calculated therefrom and/or the content of memories and in particular the correct connection and function of the signal inputs and signal generators is checked. Because of the redundant design of the safety devices in the aforementioned manner, the microprocessors can cyclically check one another and the surrounding hardware and simultaneously the program which is running can be checked for consistency. The content comparison of the processors takes place over the complete ring in the case of a ring protocol.

According to further developments of the apparatus according to the invention, each safety device has at least one safety-relevant output and/or each safety device has several safety-relevant inputs.

The complete safety structure becomes simple and very inexpensive if, according to a further development, the safety devices are constructed identically and preferably the basic software integrated into the identical safety devices is also identical and adaptations take place solely by means of software components or switches.

The method and apparatus according to the invention offer significant advantages. The ring structure of the complete monitoring device is only closed when all the functional units and their associated, individual safety devices are operating. Communication is interrupted, if a safety device indicates a malfunction. When such a lasting fault occurs, a disconnection takes place and the complete system passes into a safe state.

Further advantages result from the decentralized structure achieved by the invention which, as stated, is flexibly extendible, but still achieves reliable operating safety with limited space demands and costs. Wiring costs are minimized as a result of the inventive solution and diagnostic possibilities are improved. The safety devices according to the invention can be easily integrated into existing equipment.

BRIEF DESCRIPTION OF THE DRAWINGS

Further features of the invention can be gathered from the claims and following description of a preferred embodiment of the invention, with reference to the attached drawings, wherein show:

FIG. 3 A diagram of the operating states of the inventive apparatus ensured of by the invention.

DETAILED DESCRIPTION OF THE PREFERRED EMBODIMENTS

Figure 1:
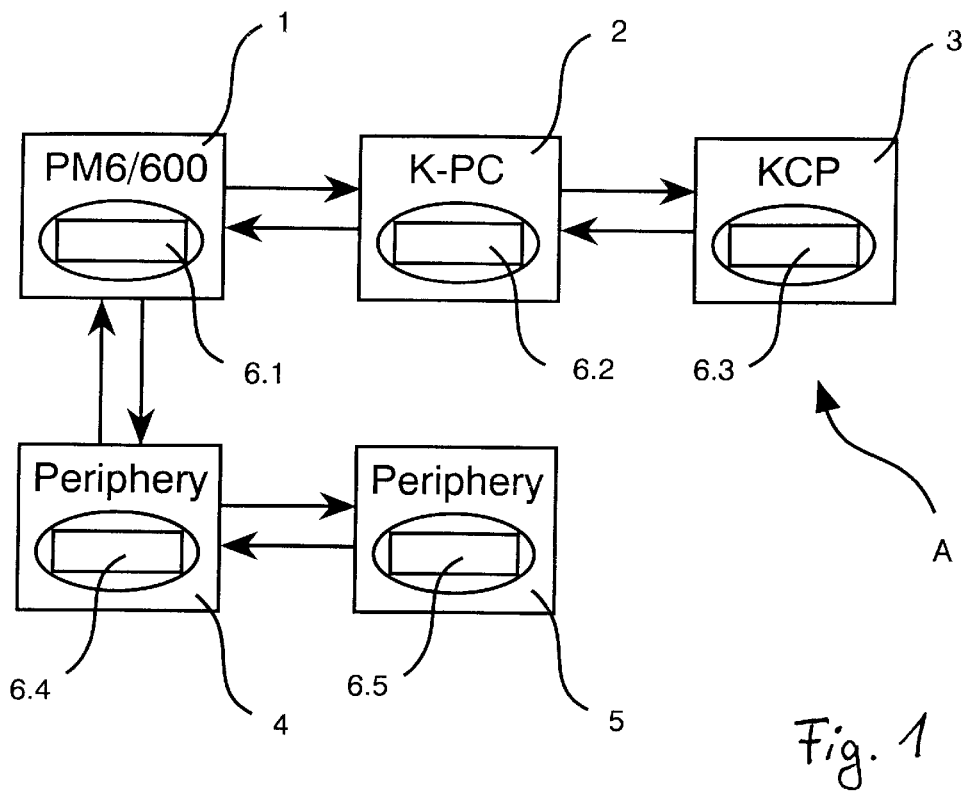
FIG. 1 A diagrammatic structure of an inventive safety device in a plant to be monitored.

An inventive apparatus is used for monitoring a plant A, such as a production plant. Such a plant e.g. has a power module 1, which contains the power electronics and mechanical components of a machine or robot. With the power module 1 is associated a control unit, which contains the signal electronics for controlling the power module 1 and can be constructed as a purely hardware circuit or in desired grading or stepping with software elements, up to a pure computer control. In the case of a robot, nowadays the power module 1 and control unit 2 are generally physically and spatially separated. A plant, on which the invention is based, can also have an operating unit 3, which can e.g. be a programming hand-operated equipment, which in the specific case can be used for programming a robot, such as the control unit 2, and in such a case is physically and spatially separated therefrom.

Such a plant can also have peripheral units 4, 5, such as e.g. a moving device for the power module 1 or e.g. in shipbuilding a portal on which are placed several power modules 1.

Figure 2:
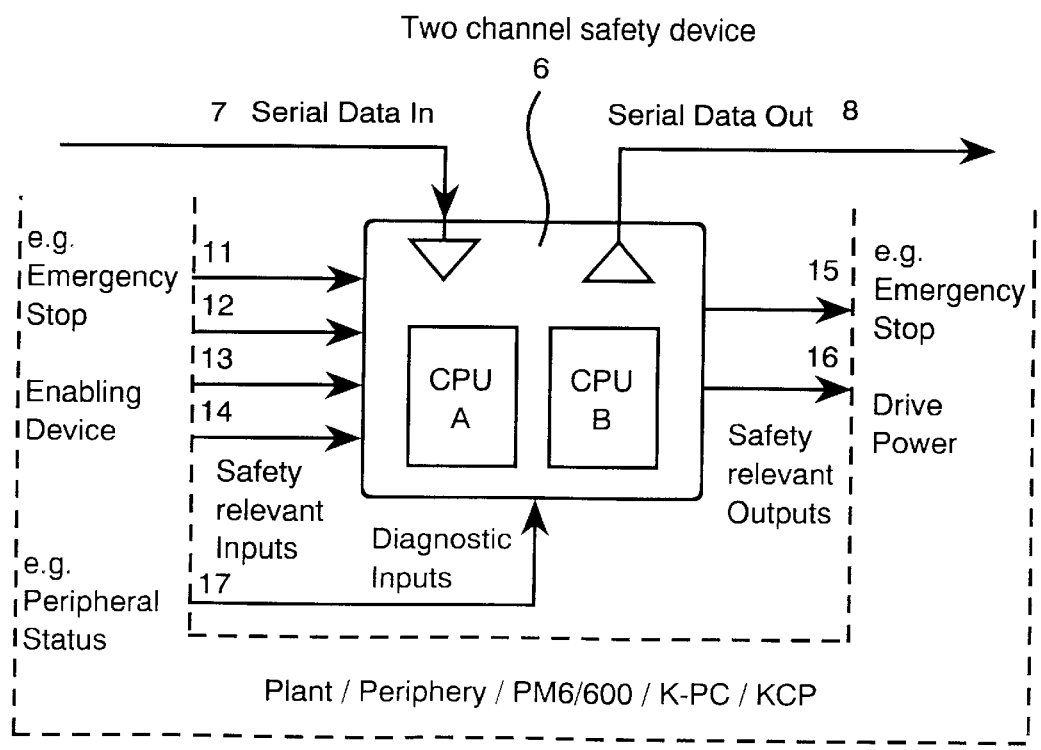
FIG. 2 A diagrammatic representation of a safety device in the apparatus according to the invention.

According to the invention, each of the functional units 1 to 5 has associated with it a separate safety device 6.1–6.5, which are advantageously identically constructed and therefore solely given the reference numeral 6 in FIG. 2. A safety device 6 has at least two microcontrollers. The latter have sufficient integrated RAMs or ROMs and at least one serial connection (point). Thus, the two-channel nature of the safety circuits can be maintained up to the evaluation. The two channels of the redundant system are constantly compared. As a function of the particular use, a different interface wiring is provided. By means of incoming and transferring interfaces or lines 7, 8, the safety devices 6.1–6.5 are interconnected. The connection is preferably constructed in a ring structure with outgoing and return lines 7, 8.

Apart from the serial connections or lines 7, 8, the inventive safety device 6 has for connection to the other safety devices safety-relevant inputs 11–14, which are connected to the particular functional unit and individual operating elements thereof and are used for introducing safety-relevant signals. Safety-relevant inputs either unconditionally introduce a stop or are the condition for such a stop. The inputs 11–14 are duplicated, so that each microcontroller has an independent input with identical function. There can also be inputs without a safety function.

They are also referred to as diagnostic inputs and have different significances on the two controllers. All the safety-relevant inputs 11–14 are evaluated in parallel by the two microcontrollers. One input can be connected to an agreement or consent key, another to an emergency-off key and another to a selection key for test or automatic operation. There is also an input for the connection of further operator protection devices. There is no need for all the inputs to be present in each functional unit. Thus, the first-mentioned inputs hereinbefore are in particular present in the operating unit, whereas the last-mentioned input (operator protection) is located in the power unit or individual peripheral units.

Local emergency-off=LNA.

This is the input for local emergency-off, which is initiated by operating the robot emergency-off on the KCP or by another emergency-off condition. In all circumstances it leads to the stopping and power release of the robot and complete plant in which the robot is integrated.

External emergency-off request=eNAA.

This input leads to the disconnection of the robot under all conditions. The emergency-off request is in this case not passed on to the plant, because this would lead to the locking thereof.

Operation protection=BS.

The operator protection input locking (for technical protection measures) only stops the safety cell. The safety cell is here understood to mean the area which can be traversed under dangerous conditions by kinematics. In the case of a robot cell, it is e.g. the robot working area bounded by a protective fence, as well as additional shafts which can perform dangerous movements. The operator protection is active when the control is operating in the automatic mode. The pending operator protection signal is tantamount to the closed protective fence of the safety cell.

1. Qualified input 1 (test/auto)=QE1.

The input 13 for test/automatic is a qualifying signal. In the test mode the operator protection is disconnected and instead the consent key is active. In the automatic mode the operator protection is active, but the consent keys are not interrogated. The safety cell can either be in the test mode or in the automatic mode. Neither the two modes simultaneously, nor no mode are possible. The closed-circuit current principle is difficult to maintain here, because both settings are active settings. It is therefore appropriate to use antiparallel levels. The signal for the microcontrollers is fed in once as automatic and once as/automatic. Hereinafter in place of the term lautomatic, the term test is used.

2. Qualifying input 2=QE2.

The same applies for input 14 as for input 1 and the input 14 is used for controls requiring a bridging of the operator protection in the test mode. On bridging the protective device in the automatic mode, the cell is shut down if the operator protection is damaged.

There are also outputs 15, 16 which, if used, control safety-relevant actuators and consequently serve to shut down the plant or move the same into a safe state. Informal inputs 17 are constructed in single-channel manner. The complete safety network is also suppliable with external voltage. Thus, each safety device 6 requires its own voltage supply. For this purpose a voltage supply accompanies the communication line. The rated voltage of this voltage supply is 24 V. Each core has its own logic voltage generation.

Safety-relevant outputs

Safety-relevant outputs are those whose correct function is vital for the disconnection of the plant power.

Drives on=AE

The safety-relevant outputs include the control for the network protection of the drives by the drives on signal. This output is present on each safety device and is safe.

Emergency-off=NA

The function of the emergency-off output is to loop a local emergency-off request into the emergency-off loop of a complete plant. To obtain potential-free contacts, the node is designed with a safe relay combination.

Operator protection=BS

Operator protection is understood to mean devices for protecting the operator, including protective fences, their monitoring means and, independently of the mode, also the consent switch. All outputs of such devices are combined in the node. The function of the operator protection output is to make operator protection damage effective for participating plant parts. To obtain potential-free contacts, a safe relay combination can be connected to the node.

In addition, informal or control inputs and inform outputs are provided:

Informal inputs

Informal or control inputs 17 are those which are necessary for the correct operation of the robot. These inputs are not safety-relevant and can be freely used. They merely make available information for diagnostic purposes. The inputs are synchronized with the test switching cycles of the safety-relevant signals. Thus, also interlinked emergency-off keys can be introduced between the contacts.

Drives activate=AA

The signal "drives activate" is a pulse, which is intended to switch on the drives, when not prevented by a safety request. This signal must not be kept permanently active.

Drives release=AF

The "drives release" signal has the function of disconnecting the drives by removal or preventing switching on.

Emergency-off Info=NAi/operator protection Info=Bsi

A local emergency-off or operator protection loop can be tapped with these inputs between the contacts, in order in the case of an interruption to obtain information on the location of the safety request.

Informal outputs

Informal outputs are those which output in order to represent the status of the safety networks. Informal outputs can be combined into a register interface. On connecting a control computer, which contains no safety-relevant actuators, safety-relevant outputs can also be used for information purposes.

I emergency-off=iNA

The function of the emergency-off information is to indicate a local emergency-off request to a control or signal light. This signal is an OR link of all emergency-off conditions with the exception of the signal: external emergency-off request.

I internal fault=iFi

The fault or error signal gives information as to whether a fault has occurred within the KU-SIBA network, which has led to disconnection.

In the power module 1, an output 15 of the safety device 6 is used as the "drives on" output for controlling a network protection. Thus, the possibility exists of directly initiating an emergency-off in the case of corresponding fault states.

All information and states of the safety circuit of the control software are available to a safety device in the control unit 2. Here again an output has an emergency-off, so as to initiate the same in the control unit 2.

A safety device 6.1 in an operating unit 3 mainly carries signal generators for emergency-off, mode selection and switching on and off the drives. A display can take place by means of control software and a display screen.

Safety devices 6.4 and 6.5 in the peripheral units 4, 5 can provide drive powers for servoswitches integrated in a protection circuit and bind into the latter signal generators such as light curtains and additional emergency-off keys of extended kinematics. For display purposes, an identical safety device can be integrated into the corresponding control panels.

FIG. 3 diagrammatically shows the operating states of the inventive safety devices. The operator protection can be opened or closed. It is possible to operate a consent key (yes) or not operate the same (no). An automatic or test operation can be selected. As is apparent from the list, during automatic operation, operation is only possible if the operator protection is closed. In the case of test operation, operation is possible with the operator protection opened and closed, but only if simultaneously the consent key is operated. The operating states can be extended with respect to further inputs, as a function of the intended use.

In the safety devices 6, 6.1–6.5, there is initially a comparison of the local results of the two microcontrollers and a check for differences. If a difference exists, the variable "comparison failed" (Vf) is incremented. It indicates the number of communication cycles, in which successively the results of both channels have not coincided. If the results are consistent, Vf is reset or decremented. On exceeding between the two channels the maximum permitted channel delay time, defined by Vf-max, then "emergency-off" is initiated and the network is locked.

The information channel used for the comparison is the same serial channel, which is also used for the communication between the safety devices.

A comparison takes place during the running process communication. One step corresponds to the data volume of a microcontroller. A sliding step is provided for the comparison being dependent on the position of the microcontroller of the safety device of the first or last for each communication. In this step the input and output image is compared with that of the parallel microcontroller in the same safety device.

Another comparison takes place at communication start or during an intermediate communication. A check is made as to whether the comparison of the process images, as well as the guidance of Vf cannot also take place in the next safety device. Thus, a comparison, during which there is a type of intermediate communication, can only last two sliding steps. In the first step each microcontroller transmits its own process data. The in each case second microcontroller of a safety device can now be compared. The in each case first microcontroller firstly notes the process image of the previous microcontroller and performs the comparison after the second sliding step. The Vf counter of this microcontroller consequently applies to the safety core previously arranged in the safety circuit.

This is followed by a link as the actual function of the safety circuit. Firstly an independent result is formed from the inputs of each individual safety device and the results of the other safety devices are taken into account in the local result prior to updating. Two possibilities exist for determining the output results. During the communication the complete process image can be interchanged and can consequently be linked in parallel in each of the total emergency-offs, but in different order. An implementing instruction can be transmitted. In this instruction all the safety devices link their results and all outputs are switched on the basis of this instruction.

Different types of safe stopping are differentiated. The emergency-off function can be initiated by different signal generators. All the connected signal generators are connected in a two-channel manner. On releasing the emergency-off, locking an infinite simultaneity between the channels can be accepted.

In the different modes, the emergency-off leads to different reactions.

In the automatic mode the disconnection of the network is delayed and safe. The initiated emergency-off is detected by the control and immediately there is an emergency-off stop ramp with which the robot remains on the programmed path. The robot stops at a calculated point.

In test operation the power supply is immediately disconnected in the case of an emergency-off request. The release for drives remains active for as long as no drive faults occur. Thus, the robot is brought with the shortest possible stopping distance and therefore most quickly into the safe state.

The operator protection now moves the local plant into the safe state. The operator protection must be linked with different signals in the different modes:
BS-release=guard closed+automatic+consent depressed+ test operation.

The operator protection always acts in undelayed manner on the power disconnection via the main protection means. The disconnection reaction of the machine or robot is such that the shortest stopping distances are always obtained.

Communication between the safety devices takes place serially and passes through both microcontrollers, so that each microcontroller is able to make available to the other controller, via the communication ring, the process image for comparison purposes. The communication is used for the comparison of the channels in the case of two-channel inputs and for deterministic updating of the output image on the total bus. Each communication takes place in sliding steps. One step corresponds to the data volume of a microcontroller. The first or last sliding step per communication is provided for the comparison, or other sliding steps being used in order to determine the total process image of the network in the individual safety devices. Process images are only taken from others, which are identically transmitted by their two controllers.

What is claimed is:

1. A method for monitoring a plant having functional units, comprising:
    individually checking each functional unit with redundant, two-channel safety devices therein, and wherein:
        the safety devices continuously communicate a monitoring state thereof to all of the safety devices and at least one safety relevant actuator is operated when a malfunction occurs in at least one functional unit or safety device.
2. A method according to claim 1, further comprising:
    serially communicating between the safety devices.
3. A method according to claim 2 further comprising:
    serially communicating between the safety devices with a ring protocol.
4. A method according to claim 1 further comprising:
    continuously performing a diagnosis of the functional units associated with the safety devices and the plant.
5. A method according to claim 2 further comprising:
    continuously performing a diagnosis of the functional units associated with the safety devices and the plant.
6. A method according to claim 1 further comprising:
    cyclically checking a processor image of microprocessors contained in the safety devices, a result calculated therefrom and/or a content of memories associated with the microprocessors.
7. A method according to claim 2 further comprising:
    cyclically checking a processor image of microprocessors contained in the safety devices, a result calculated therefrom and/or a content of memories associated with the microprocessors.
8. A method according to claim 1 comprising:
    checking if a correct connection and function of signal inputs and signal generators of the safety devices are present.
9. A method according to claim 2 comprising:
    checking if a correct connection and function of signal inputs and signal generators of the safety devices are present.
10. An apparatus for monitoring a plant having functional units comprising:
    a redundant, two-channel safety device in each functional unit with the safety devices being connected together and at least one safety-relevant actuator which, when a malfunction occurs in at least one functional unit or safety device, the malfunctioning unit or safety device operates at least one of the at least one safety-relevant actuator.
11. An apparatus according to claim 10, wherein:
    the safety device have a controller and interface wiring.
12. An apparatus according to claim 10, wherein:
    the safety devices are serially interconnected.
13. An apparatus according to claim 11, wherein:
    the safety devices are serially interconnected.
14. An apparatus according to claim 10, wherein:
    the safety devices are interconnected in a ring.
15. An apparatus according to claim 11, wherein:
    the safety devices are interconnected in a ring.
16. An apparatus according to claim 10, wherein:
    each safety device has at least one microprocessor.
17. An apparatus according to claim 11, wherein:
    each safety device has at least one microprocessor.
18. An apparatus according to claim 16, wherein:
    each safety device has at least two microprocessors.
19. An apparatus according to claim 17, wherein:
    each safety device has at least two microprocessors.
20. An apparatus according to claim 10, wherein:
    each safety device has at least one safety-relevant output.
21. An apparatus according to claim 11, wherein:
    each safety device has at least one safety-relevant output.
22. An apparatus according to claim 10, wherein:
    each safety device has safety relevant inputs.
23. An apparatus according to claim 11, wherein:
    each safety device has safety relevant inputs.
24. An apparatus according to claim 10, wherein:
    each safety device has diagnostic inputs.
25. An apparatus according to claim 11, wherein:
    each safety device has diagnostic inputs.
26. An apparatus according to claim 24, wherein:
    the diagnostic inputs are synchronized with test switching cycles of safety inputs of the safety devices.
27. An apparatus according to claim 25, wherein:
    the diagnostic inputs are synchronized with test switching cycles of safety inputs of the safety devices.
28. An apparatus according to claim 10, wherein:
    the safety devices are identically constructed.
29. An apparatus according to claim 11, wherein:
    the safety devices are identically constructed.

* * * * *